US007174026B2

(12) United States Patent
Niederdränk

(10) Patent No.: US 7,174,026 B2
(45) Date of Patent: Feb. 6, 2007

(54) SELECTION OF COMMUNICATION CONNECTIONS IN HEARING AIDS

(75) Inventor: Torsten Niederdränk, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 157 days.

(21) Appl. No.: 10/341,984

(22) Filed: Jan. 14, 2003

(65) Prior Publication Data

US 2003/0133582 A1 Jul. 17, 2003

(30) Foreign Application Priority Data

Jan. 14, 2002 (DE) ................................ 102 01 068

(51) Int. Cl.
*H04R 25/00* (2006.01)
*H04B 7/00* (2006.01)

(52) U.S. Cl. ...................... 381/315; 381/312; 455/41.2

(58) Field of Classification Search ................ 381/312, 381/315, 314, 313, 320–321, 323, 328, 331, 381/380; 455/41.1–41.3, 569.1, 415
See application file for complete search history.

(56) References Cited

U.S. PATENT DOCUMENTS

| | | | | |
|---|---|---|---|---|
| 4,920,570 | A | 4/1990 | West et al. | |
| 4,972,487 | A * | 11/1990 | Mangold et al. | 381/315 |
| 5,083,312 | A * | 1/1992 | Newton et al. | 381/320 |
| 5,553,152 | A * | 9/1996 | Newton | 381/328 |
| 5,659,621 | A * | 8/1997 | Newton | 381/312 |
| 6,229,900 | B1 * | 5/2001 | Leenen | 381/314 |
| 6,240,194 | B1 * | 5/2001 | De Koning | 381/315 |
| 6,763,116 | B2 * | 7/2004 | Barthel et al. | 381/312 |
| 6,871,067 | B2 * | 3/2005 | Clark et al. | 455/428 |
| 2004/0077315 | A1 * | 4/2004 | Crook | 455/41.2 |
| 2004/0198223 | A1 * | 10/2004 | Loh et al. | 455/41.1 |
| 2004/0198464 | A1 * | 10/2004 | Panian | 455/569.1 |

FOREIGN PATENT DOCUMENTS

| | | |
|---|---|---|
| DE | 40 33 673 A1 | 4/1992 |
| DE | 195 44 546 | 6/1997 |

* cited by examiner

*Primary Examiner*—Melur Ramakrishnaiah
*Assistant Examiner*—Phylesha Dabney
(74) *Attorney, Agent, or Firm*—Schiff Hardin LLP

(57) ABSTRACT

A hearing aid and a corresponding method are provided in which address data and/or channel data with respect to a plurality of signal sources are stored in a memory of the hearing aid. As a result of a priority-driven address management system, the hearing aid user can very conveniently automatically engage in communication with an interface having the highest priority.

15 Claims, 1 Drawing Sheet

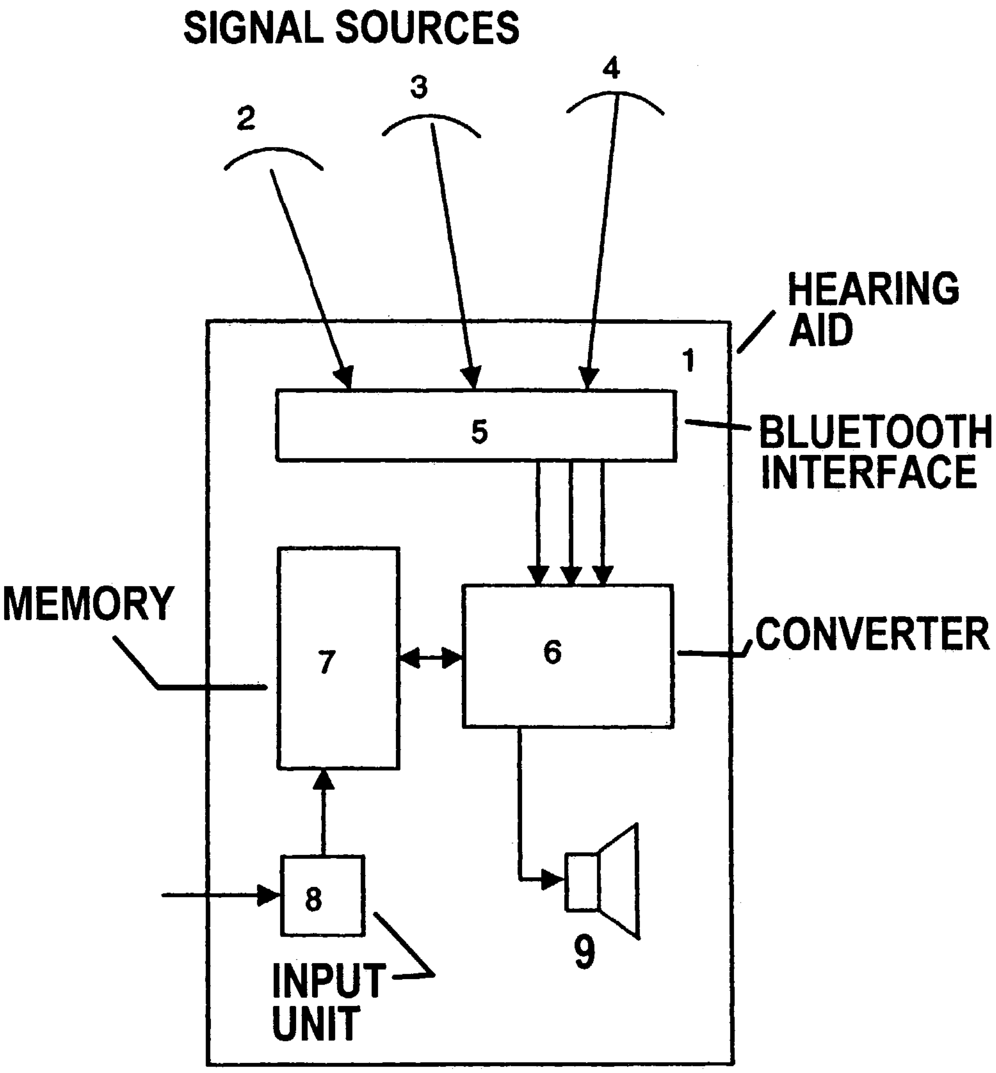
FIG.

SELECTION OF COMMUNICATION CONNECTIONS IN HEARING AIDS

BACKGROUND OF THE INVENTION

1. Field of the Invention

The present invention is directed to a hearing aid having a radio interface for receiving radio signals from signal sources and converting the radio signals into acoustic signals as well as having a memory device for storing address data with respect to one of the signal sources. The present invention is also directed to a corresponding method. In particular, the present invention is directed to a method for individually selecting the communication connections for bluetooth transmission systems in hearing aid applications.

2. Description of the Related Art

German patent document DE 195 44 546 A1 discloses a hearing aid with a microphone, a signal processor and an earphone, as well as a method for the operation of a digital hearing aid in which the hearing aid comprises a digital input. The digital input can be connected in via a switchover device for supplying signals of digital signal sources. Thus, signals of a CD player or DAT recorder or radio signals can be fed into the hearing aid.

Due to the increasing number of multimedia and telecommunication applications, the employment of "headsets" (audio-active devices) and headphones is becoming more and more pronounced. Wireless transmission systems, particularly according to the bluetooth standard, are being increasingly utilized for further simplification of using headsets and replacing cumbersome cable connections to other communication interfaces.

There is also a need to utilize such wireless communication for hearing-impaired persons. For example, a hearing aid can be equipped with a wireless transmission interface according to the bluetooth standard and can thus be utilized as a universal communication interface.

The following problem, however, is present when using a bluetooth interface and other interfaces in hearing aids. A bluetooth interface is normally suited for setting up transmissions that are point-to-point as well as point-to-multipoint. A pre-condition for setting up the transmission link, however, is to recognize the currently reachable bluetooth transceivers on the basis of their characteristic addresses and to be able to select these as warranted. This generally requires an involved user interface with keyboard and display elements. A bluetooth transceiver can optionally communicate with specific bluetooth communication interfaces in this way. Such operating and display elements, however, are not available for an interface integrated into a hearing aid.

A very limited communication function has therefore been available given previously available bluetooth headsets. The headsets log onto an address that is permanently prescribed and stored once, so that a permanently defined point-to-point connection can be set up to, for example, a mobile telephone. Storing this address can be achieved, for example, in that the headset is brought into the immediate proximity of the desired transmitter and a push-button at the headset is actuated.

For using bluetooth technology in hearing aids, however, it would be desirable to be able to simultaneously or sequentially set up a connection to a plurality of communication locations, for example a telephone, PC, television set, stereo system, etc.

SUMMARY OF THE INVENTION

The object of the present invention is thus to provide a hearing aid and a corresponding method to facilitate communications with a plurality of communication interfaces.

This object is achieved by a hearing aid, comprising a radio interface (which may be a bluetooth interface) configured to receive radio signals from signal sources and to convert the radio signals into at least one of acoustic signals and control signals; a memory device configured to store at least one of address data and channel data with respect to a plurality of the signal sources; and an address management system configured to allocate priorities to the plurality of signal sources whose at least one of address data and channel data are stored. The hearing aid may comprise a presetter configured to preset a highest priority or highest priorities for at least one of address data and channel data. The hearing aid may also comprise a switch device (which may be a push button) configured to initiate storing at least one of address data and channel data. The hearing aid may further comprise a signal generator device for generating an acoustic signal when signals from a signal source with a higher priority are received during a reception of signals from a signal source. One of the signal sources may be automatically selected based on a priority or on a basis of an external control signal or can be manually selected using a push-button.

This object is also achieved with a method for operating a hearing aid, comprising receiving radio signals from a plurality of signal sources; storing at least one of address data and channel data with respect to the plurality of signal sources; coupling at least one of address data and channel data with priority information; and converting the received radio signals from one of the plurality of signal sources whose at least one of address data and channel data are stored into at least one of acoustic signals and control signals. The method may further comprise presenting at least one of address data and channel data having the highest priority or the highest priorities. The method may further comprise actuating a switch device at the hearing aid; and storing at least one of address data and channel data are by the actuating of the switch device at the hearing aid. The method may further comprise generating an acoustic signal by the hearing aid when signals from a signal source with a higher, second priority are received during reception of signals from a signal source with a first priority. The method may further comprise automatically selecting one of the signal sources based on a priority or based on an external control signal or is manually selected. One of the signal sources may be manually selected.

In more detail, advantageously, it is thus possible for the user of a hearing aid: 1) to store the addresses of a plurality of signal sources, particularly the channel data or channels given analog devices, either in advance or dynamically as needed, and 2) to set up a corresponding communication connection on the basis of the channel list or address list. The channel or address management preferably ensues in a priority-driven manner so that the individual needs of the hearing aid user can be better met.

The selection of the signal source can ensue manually or automatically. For example, a specific transmitter can be provided in a room for the purpose of switching the hearing aid in this room into a specific hearing program or onto a specific signal source.

DESCRIPTION OF THE DRAWING

The present invention is explained below in greater detail based on the attached drawing, which is a block diagram schematically showing an embodiment of the inventive hearing aid.

DETAILED DESCRIPTION OF THE INVENTION

The FIGURE shows a hearing aid 1 that receives radio signals from a plurality of transmitters or signal sources 2, 3, 4. A radio receiver, which preferably contains a bluetooth interface 5, registers all radio signals and forwards them to a converter 6.

The address of possible transmitters or signal sources 2, 3, 4 are stored in an address register or memory 7 and respectively provided with a priority. The addresses and/or priorities can be input into the hearing aid using an input unit 8.

Based on the priority from the address register 7, the converter 6 decides which of the signals sent from the signal sources 2, 3, 4 must be converted into an acoustic signal for an output unit 9 in the hearing aid 1. Over and above this, a manual selection of the signal source can be alternatively or additionally provided, for example via a push-button.

The detailed functioning of the inventive device with optional connection to a plurality of communication interfaces is presented in greater detail below.

Typically, a bluetooth transmission system is composed of a high-frequency part of the analog front end that is coupled to a digital baseband part. The various layers of the bluetooth communication model are generally realized therein by employing suitable software implementations on a processor system. The uppermost layer represents the application layer in which the functionalities of the system is defined, on the one hand, and the mechanism for identifying the addresses of the communication partners is realized, on the other hand.

The priority-driven address management system indicated above knows a plurality of addresses of signal sources and thus allows optional communication with a plurality of interfaces. When, for example, there are possibilities for storing three addresses, then an acoustician could deposit the two addresses with the highest priority in the first two memory positions during the programming of the hearing aid (for example, for telephone and television). The third memory location, in contrast, could be dynamically assigned upon operation of a push-button, as is standard for headset applications. Given a fixed allocation of the priorities, the hearing aid system—when reachability has been established—can communicate with the communication interface that has the highest priority at the moment.

Given reception of signals from a signal source having higher priority during a communication of a bluetooth interface with a lower priority, the hearing aid user can be alerted about this signal reception (e.g., from a telephone) via an acoustic signal. Upon utilization of the previously mentioned push-button, the hearing aid user could then sequentially select among the communication possibilities identified on the basis of the addresses.

Additionally, there is the possibility of simultaneously converting the signals of a plurality of data sources or audio sources into acoustic signals. For this purpose, the sound level for the respective signals could be adapted to the priorities of the signal sources either automatically or via the bush-button.

The present invention thus advantageously enables the employment of an address list with a prioritization and different methods for address allocation for expanding the communication capability of a bluetooth interface in hearing aids.

For the purposes of promoting an understanding of the principles of the invention, reference has been made to the preferred embodiments illustrated in the drawing, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters

| | |
|---|---|
| 1 | hearing aid |
| 2 | signal source |
| 3 | signal source |
| 4 | signal source |
| 5 | bluetooth interface |
| 6 | converter |
| 7 | memory device |
| 8 | input unit |

What is claimed is:

1. A hearing aid, comprising:

a hearing aid housing designed to be worn as a conventional hearing aid including within:

an acoustic signal input and an acoustic signal;

a radio interface configured to receive radio signals from a plurality of external signal sources and to directly convert the radio signals into electrical signals representing address data of said plurality of external signal sources;

a memory device configured to store said address data; and an address management system configured to allocate priorities to the plurality of external signal sources whoso address data are stored in said memory device; and wherein one of the signal sources can be automatically selected based on a priority or on a basis of an external control signal or can be manually selected using a push-button.

2. The hearing aid according to claim 1, further comprising:

an input unit connected to the memory device and configured to initiate storing at least one of address data and channel date.

3. The hearing aid according to claim 2, wherein the input unit includes a push-button.

4. The hearing aid according to claim 1, further comprising:

a signal generator device for generating an acoustic signal when signals from a signal source of said external signal sources with a higher priority are received during a reception of signals from a signal source of said external signal sources with a lower priority.

5. The hearing aid according to claim 1, wherein the radio interface is a bluetooth interface.

6. The method according to claim 5, further comprising:

generating an audio signal by the hearing aid when signals from an external signal source with a higher, second priority are received during reception of signals from an external signal source with a first priority.

7. The hearing aid according to claim 1, wherein:

the radio interface is a bluetooth interface;

the external signal sources are bluetooth signal sources; and the address date are bluetooth address date.

8. The hearing device according to claim 1, wherein:

the radio interface is configured to simultaneously receive radio signals from a plurality of external signal sources and to directly and convert the simultaneously received radio signals into electrical signals; and the address management system is configured to allocate priorities to the plurality of simultaneously received external signal sources.

9. The hearing aid device according to claim 1, wherein:

the memory device is configured to dynamically store said address data when the radio interface receives the radio signals; and the address management system is configured to allocate priorities to the plurality of external signal sources whose said address data were dynamically stored in said memory device.

10. A method for operating a hearing aid, comprising, within a housing of the hearing aid:

receiving radio signals from a plurality of external signal sources;

directly converting the received radio signals from one of the plurality of external signal sources into electrical signals representing address date of said plurality of external signal sources;

storing said address date; and allocating priorities to the plurality of external signal sources whose address date are stored;

automatically selecting based on a priority or on a basis of an external control signal or can be manually selected using a push-button.

11. The method according to claim 10, further comprising manually presetting presenting at least one of address data and channel date having the highest priority or the highest priorities.

12. The method according to claim 10, further comprising:

actuating an input unit connected to a memory device of the hearing aid; and storing at least one of address data and channel date by the actuating of the input unit of the hearing aid.

13. The method according to claim 10, further comprising:

automatically selecting one of the signal sources baaed on a priority or based on an external control signal or manual selection.

14. The method according to claim 10, further comprising:

manually selecting one of the external signal sources.

15. The method according to claim 10, further comprising:

providing a bluetooth standard receiver for the reception of the radio signals.

* * * * *